United States Patent [19]

McClain

[11] 4,212,966
[45] Jul. 15, 1980

[54] PROCESS OF PREPARING FINELY DIVIDED THERMOPLASTIC RESINS

[75] Inventor: Dorothee M. McClain, Cincinnati, Ohio

[73] Assignee: National Distillers & Chemical Corporation, New York, N.Y.

[21] Appl. No.: 24,760

[22] Filed: Mar. 28, 1979

Related U.S. Application Data

[63] Continuation-in-part of Ser. No. 934,641, Aug. 17, 1978, abandoned.

[51] Int. Cl.$^2$ .................................. 536 56; C08F 6/00
[52] U.S. Cl. ...................................... 528/486; 525/62; 526/352; 526/352.2; 528/487; 528/488; 528/489
[58] Field of Search .................... 526/10, 11; 528/487, 528/488, 489, 486; 536/56; 525/62

[56] References Cited

U.S. PATENT DOCUMENTS 4,151,134   4/1979   McClain ........................... 260/23 H

FOREIGN PATENT DOCUMENTS 88404   3/1971   German Democratic Rep. .

*Primary Examiner*—Stanford M. Levin
*Attorney, Agent, or Firm*—Kenneth D. Tremain

[57] ABSTRACT

Powders of thermoplastic resins such as polyethylene homopolymer and ethylene-vinyl acetate copolymer are obtained by agitating molten resin in admixture with water in the presence of a dispersing system comprising a dispersing amount of a surface active agent selected from the group consisting of sulfates, sulfonates, sarcosinates, taurates, isethionates, fatty amido phosphates, fatty amide derivatives, amido amines, higher alkyl amines, substituted imidazolines, substituted betaines, ethoxylated alkylol amides, ethoxylated phenols and ethoxylated fatty ethers in combination with a dispersion promoting amount of strong base. Optionally, the dispersing system can also contain a water-soluble substantially neutral salt to further promote dispersion formation.

25 Claims, No Drawings

PROCESS OF PREPARING FINELY DIVIDED THERMOPLASTIC RESINS

This application is a continuation-in-part of application Ser. No. 934,641, filed Aug. 17, 1978 now abandoned.

BACKGROUND OF THE INVENTION

1. Field of the Invention

This invention belongs to the field of processes for providing thermoplastic resins in fine powder form and, more particularly, to such processes in which the powders are obtained from aqueous dispersions of resin.

2. Description of the Prior Art

Thermoplastic resins in finely-divided form have found use in a number of applications where it is either impossible or inconvenient to utilize the more conventional cube or pellet forms. For example, powdered organic polymeric thermoplastic resins in dry form have been used to coat articles by dip coating in either a static or fluidized bed, by powder coating wherein the powder is applied by spraying or dusting, and by flame spraying. In dispersed form, thermoplastic resin powders have been applied as coatings by roller coating, spray coating, slush coating, and dip coating to substrates such as metal, paper, paper-board, and the like. These powders have also been widely employed in conventional powder molding techniques. Other applications of these powders include paper pulp additives; mold release agents for rubber; additives to waxes, paints, and polishes; binders for non-woven fabrics; and so on.

It is well known that high molecular weight thermoplastic resins, for example, polyethylene and ethylene copolymers, may be converted to dispersions of spherically shaped particles which are substantially devoid of particles greater than 25 microns in diameter and in which the number average particle diameter is less than about 10 microns. Thus, McClain U.S. Pat. No. 3,422,049 teaches that such dispersions of finely divided particles may readily be prepared by agitating the molten resin in admixture with water at elevated temperatures and at autogenous pressure, in the presence of certain dispersing agents which are particular block copolymers of ethylene oxide and propylene oxide. The non-agglomerated spherical particles can be recovered as powders by cooling the dispersions below the fusion point of the resin and collecting the suspended material by filtration or centrifugation.

U.S. Pat. No. 3,418,265 further teaches that the particle size of such thermoplastic resin dispersions can be reduced still further, to the sub-micron level, while retaining the unique spherical particle shape by including in the dispersions process a volatile, inert, water-insoluble organic liquid that is soluble in the thermoplastic resin in an amount between 0.5 and 20 parts per 100 parts of the resin, whereupon a stable, aqueous, film-forming latex is ultimately obtained as the final product. Alternatively, U.S. Pat. No. 3,522,036 teaches that stable, film-forming aqueous latices of high molecular weight polyethylene can also be formed by including a liquid vinyl monomer such as styrene in the dispersion process.

Although the foregoing dispersion procedures are conveniently operated as batch processes, it is also known to produce such finely divided powders in a sequential, continuous dispersion process. See, e.g., U.S. Pat. No. 3,432,483.

U.S. Pat. No. 3,586,654 teaches that it is further possible to conduct the dispersion process in such a way that the polymer particles may be further transformed into spherical particles of controlled average size and size distributions which are the same, larger or smaller than the starting particles. If desired, the dispersion process can be modified in such a manner as to produce spherical foamed particles (U.S. Pat. No. 3,472,801), or to incorporate within the particles certain colorants (U.S. Pat. No. 3,449,291) and pigments (U.S. Pat. No. 3,674,736).

The fine powders are, by virtue of their small particle size, narrow particle size range, and spherical particle shape, unique states of matter which cannot readily be prepared by other conventional processes known in the art. The advantages and utility of such fine powders has been described in many of the aforesaid patent disclosures. In addition, it has been found that various substrates can be coated by applying the above described dispersions of polyolefin fine powers in an inert carrier, heating to evaporate the carrier, and fusing the polyolefin to the substrate (U.S. Pat. No. 3,432,339). Further, U.S. Pat. No. 3,669,922 teaches a process for preparing colored polymer powders having controlled charge and printing characteristics of value as toners in electrostatic printing.

SUMMARY OF THE INVENTION

In accordance with this invention a normally solid thermoplastic resin is rapidly dispersed under conditions of rapid mixing in water heated to a temperature at or above the melting point of the resin, employing as the dispersing system, at least one nonionic, anionic, cationic or amphoteric surface active agent which by itself is incapable of forming a dispersion of the resin, in combination with a dispersion promoting amount of strong base, and following cooling of the aqueous dispersion to a temperature below about 100° C., the resin is recovered therefrom as a finely divided powder. The use of the aforesaid dispersing systems generally provides resin particles which are larger than those obtained by the use of the block copolymers of ethylene oxide and propylene oxide heretofore employed as resin dispersants and affords wider ranges of resin particle size than those attainable with the latter dispersants without, however, requiring the use of large amounts of surface active material. In addition, the dispersing systems herein substantially avoid the, at times, objectionable ultrafine (about 10 microns or less) resin particle fractions which can be produced by the aforementioned block copolymers of ethylene oxide and propylene oxide.

It is also within the scope of this invention to include a water-soluble substantially neutral salt, e.g., sodium chloride, in the dispersing systems herein to further enhance the dispersion forming capability of the alkaline surface active agents.

Briefly stated, the invention herein provides a process for preparing in a finely divided form a solid organic polymeric thermoplastic resin which comprises:

(a) agitating a mixture of the resin while in the molten state, a dispersion-forming amount of water, and a dispersing system comprising a dispersing amount of a surface active agent selected from the group consisting of sulfates, sulfonates, sarcosinates, taurates, isethionates, fatty amide phosphates, fatty amide derivates, amido amines, higher alkyl amines, substituted imidazolines, substituted betaines and ethoxylated fatty ethers, in combination with a dispersion promoting amount of strong base, to provide an aqueous dispersion of the resin; and, (b) cooling the dispersion usually to below about 100° C. to provide solid particles of resin.

The cooled dispersion of resin powder can be directly employed in various applications or the resin powder can be recovered therefrom using known and conventional procedures such as filtration or centrifugation.

DESCRIPTION OF THE PREFERRED EMBODIMENTS

In general, the polymers suitable for the practice of this invention include any normally solid synthetic organic polymeric thermoplastic resin whose decomposition point is somewhat higher than its melting point and somewhat less than the critical temperature of water. Included are polyolefins, vinyls, olefin-vinyl copolymers, olefin-allyl copolymers, polyamides, acrylics, polystyrenes, cellulosics, polyesters, and fluorocarbons.

The polyolefins most suitable for the practice of this invention include normally solid polymers of olefins, particularly mono-alpha-olefins, which comprise from two to about six carbon atoms, e.g., polyethylene, polypropylene, polybutene, polyisobutylene, poly(4-methylpentene), and the like. Preferred polyolefin feeds are polyethylene and polypropylene.

Vinyl polymers suitable for use in this invention include polyvinyl chloride, polyvinyl fluoride, vinyl chloride/vinyl acetate copolymers, polyvinylidene chloride and fluoride.

Suitable olefin-vinyl copolymers include ethylene-vinyl acetate, ethylene-vinyl propionate, ethylene-vinyl isobutyrate, ethylene-vinyl alcohol, ethylene-methyl acrylate, ethylene-ethyl acrylate, ethylene-ethyl methacrylate, ethylene-acrylic acid, ethylene-methacrylic acid and their salts and the like. Especially preferred are ethylene-vinyl acetate copolymers wherein the ethylene constitutes at least about 25% of the copolymer by weight.

Olefin-allyl copolymers include ethylene-allyl alcohol, ethylene-allyl acetate, ethylene-allyl acetone, ethylene-allyl benzene, ethylene-allyl ether, ethylene-allyl acrolein, and the like. Ethylene-allyl alcohol is especially preferred.

Preferred among the polyamides are linear superpolyamide resins commonly referred to as nylons. Such polymers can be made by the intermolecular condensation of linear diamines containing from 6 to 10 carbon atoms with linear dicarboxylic acids containing from 2 to 10 carbon atoms. Equally well, the superpolyamides may be made from amide-forming derivatives of these monomers such as esters, acid chlorides, amine salts, etc. Also suitable are superpolyamides made by the intramolecular polymerization of omega-amino-acids containing 4 to 12 carbon atoms and of their amide-forming derivatives, particularly the internal lactams. Examples of specific nylons are polyhexamethylene adipamide, polyhexamethylene sebacamide, and polycaprolactam. Especially preferred are nylons having intrinsic viscosities ranging between 0.3 and 3.5 dl/g. determined in m-cresol.

Acrylic resins suitable for use in this invention include polymethyl methacrylate, polyacrylonitrile, polymethyl acrylate, polyethyl methacrylate, etc. Preferred is polymethyl methacrylate.

A wide variety of anionic, cationic, nonionic and amphoteric surface active agents are employed in the dispersion systems of this invention in combination with a strong base which must be present if a satisfactory dispersion of resin is to be achieved.

Among the anionics which can be used herein with good results are the sulfates, sulfonates, sarcosinates, taurates, and isethionates.

Salts of sulfate half-esters of three different types (I, II, III) are operable in this invention:

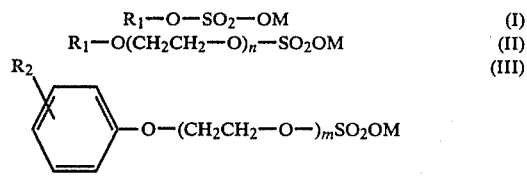

wherein $R_1$ represents a fatty aliphatic group containing from about 8 to about 22 carbon atoms, which may be linear or branched and be saturated or contain one or two olefinic carbon-carbon double bonds; $R_2$ represents a linear or branched alkyl group containing from about 6 to about 16 carbon atoms; n and m each range from about 2 to about 100; and M is a univalent cation such as $Li^+$, $Na^+$, $K^+$, and $NH_4^+$. In the preferred sulfate half-esters, $R_1$ is a linear saturated fatty alkyl of from about 10 to about 18 carbon atoms, $R_2$ contains from about 8 to about 10 carbon atoms, n and m are each from about 4 to about 75, and M is $Na^+$, $K^+$ or $NH_4^+$. An example of the alkyl sulfates of formula I is sodium lauryl sulfate, known by such trade names as Polystep B-5 (Stepan Chemical Co.); Texapon K-12 (Henkel Inc. USA); Maprofix LK (Onyx Chemical Co.) and Duponol WAQE (DuPont Co.). Examples of alkyl ether sulfates of formula II are sodium lauryl ether sulfate, available commercially as Polystep B-12 (Stepan Chemical Co.), and sodium alcohol ether sulfate, known commercially as Witcolate 1050 (Witco Chemical Corp.). An example of an alkylaryl ether sulfate of formula III is Triton X-301 (Rohm & Haas Co.) and Alipal CO-433 (GAF Corp.) which conforms to formula III wherein $R_2$ is nonyl, m is 4, and M is $Na^+$.

Alkali metal salts of aromatic and aliphatic sulfonic acids which can be advantageously employed herein include the surfactants of formula IV as follows:

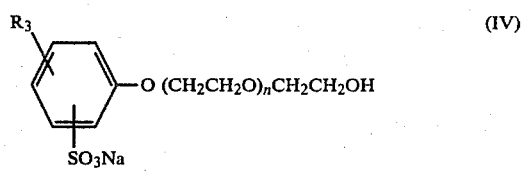

wherein $R_3$ is an aliphatic group of from about 6 to 16 carbon atoms and n is from about 2 to 100. In the preferred surfactants, $R_3$ contains from about 8 to 12 carbon atoms and n is from about 4 to about 75. Triton X-200 (Rohm & Haas Co.) is representative of such surfactants. Another type of useful sulfonate is Ultra SXS, (Witco Chemical Corp.) a sodium xylene sulfonate of the formula:

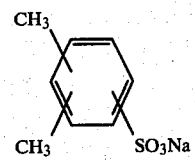

(V)

Also operable are the alkylbenzenesulfonates of formula VI:

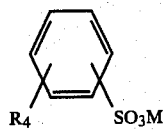

(VI)

wherein $R_4$ is a linear or branched alkyl radical of from about 6 to about 16 carbon atoms, and preferably from about 8 to about 12 carbon atoms, and M is $Na^+$, $K^+$ or $NH_4^+$. Conco AAS-905 (Continental Chemical Co.) is representative of this type. Another group of useful sulfonates is the alphaolefin sulfonates of formula VII:

$$R_5-SO_3Na \qquad (VII)$$

wherein $R_5$ is a linear or branched alkyl group of from about 6 to about 18 carbon atoms, and preferably from about 10 to about 14 carbon atoms. Bioterge AS-40 (Stepan Chemical Co.) is illustrative of a formula VII sulfonate.

Included among the sarcosinates for use herein are the salts of N-fatty acyl sarcosines of formula VIII:

$$\underset{\underset{\text{CH}_3}{|}}{R_6-CO-N-CH_2COOM} \qquad (VIII)$$

wherein $R_6$ is an aliphatic radical of from about 7 to about 22 carbon atoms, and preferably from about 10 to about 18 carbon atoms and may be linear or branched, saturated or unsaturated with one or two olefinic bonds, and M is an alkali metal cation or an ammonium cation. Examples of formula VIII surfactants are Sarkosyl NL-97 (Ciba-Geigy Corp.), a sodium lauroyl sarcosinate; Sarkosyl O (Ciba-Geigy Corp.), an oleoyl sarcosinate (as its sodium salt); Hamposyl L (Hampshire Chemical), a lauroylsarcosine (as its sodium sodium salt); Hamposyl O, an oleoylsarcosine (as its sodium salt); and Hamposyl S, a stearoylsarcosine (as its sodium salt).

Taurate surfactants which are useful in this invention are those conforming to formula IX:

$$\underset{\underset{\text{R}_8}{|}}{R_7-CO-N-CH_2CH_2SO_2OM} \qquad (IX)$$

wherein $R_7$ is a linear or branched fatty aliphatic group of from about 8 to about 22 carbon atoms, and preferably from about 11 to about 17 carbon atoms, and is saturated or unsaturated with one or two olefinic bonds, $R_8$ is an alkyl or cycloalkyl group such as methyl, ethyl, propyl, or cyclohexyl, and M is an alkali metal cation or an ammonium cation. Illustrative of such surfactants are Igepon CN-42 (GAF Corp., Chemical Products), a sodium N-cyclohexyl-N-palmitoyltaurate; Igepon T-33 and Igepon T-43, sodium N-methyl-N-oleoyltaurates in liquid and paste form, respectively; and Igepon TC-42, a sodium N-cocoyl-N-methyltaurate.

Useful isethionate surfactants include those of formula X:

$$R_9COO\ CH_2CH_2SO_2OM \qquad (X)$$

wherein $R_9$ is a linear or branched aliphatic group of from about 7 to about 21 carbon atoms, and preferably from about 11 to about 17 carbon atoms, and is saturated or unsaturated with one or two olefinic bonds, and M is $Na^+$, $K^+$ or $NH_4^+$. Illustrative of the isethionates are Igepon AC-78 (GAF Corp., Chemical Products), Coconut-oil acid ester of sodium isethionate; and Igepon AP-78, oleic acid ester of sodium isethionate.

Cationic surfactants which can be advantageously used herein include Avitex NA (DuPont Co.), a complex higher alkylamine; Ceranine NC, Ceranine NCA and Ceranine PNS (Sandoz Colors and Chemicals), which are fatty amide derivatives; Pave 192 (Cincinnati Milacron) and Rycofax 618 (Ryco Inc.) which are amido-amines; and Permalene A-141 (Refined-Onyx Div.), an ethoxylated amine; Schercozolines (Scher Chemicals Co.), e.g., B, a substituted imidazoline from a $C_{20}$ to $C_{22}$ fatty acid, L, a substituted imidazoline from lauric acid, and S, a substituted imidazoline from stearic acid; Varisofts (Ashland Chemical), e.g., 475, a methyl (1) alkylamidoethyl (2) alkyl imidazolinium methosulfate, and 3690, a methyl (1) oleyl amidoethyl (2) oleylimidazolinium methyl sulfate; and T.D. 20 and T.D. Conc. (Refined-Onyx Div.), imidazolinium surfactants.

Nonionic surfactants which are useful in this invention include fatty amides, ethylenebisamides, dialkanolamides, ethoxylated dialkanolamides, and ethoxylated phenols. Among the fatty amides are those of formula XI:

$$R_{10}CON(R_{11})_2 \qquad (XI)$$

wherein $R_{10}$ is a linear or branched aliphatic group of from about 7 to about 21 carbon atoms, and preferably from about 11 to about 17 carbon atoms, and is saturated or unsaturated with one or two olefinic bonds and $R_{11}$ is an alkyl group such as methyl, ethyl, propyl, etc. Illustrative are Hallcomid M8-12 (The C. P. Hall Co.), N,N-dimethyl lauramide; Hallcomid M-18, N,N-dimethyl stearamide; and Hallcomid M18-OL, N,N-dimethyl oleamide.

Ethylenebisamides include those of formula XII:

$$R_{12}CONHCH_2CH_2NHCOR_{12} \qquad (XII)$$

wherein $R_{12}$ is a linear or branched aliphatic group of from about 7 to about 21 carbon atoms, and preferably from about 12 to about 18 carbon atoms, and is saturated or unsaturated with one or two olefinic bonds. Illustrative are Kemamide W-40 (Humko Sheffield Chemical), N,N-ethylenebisstearamide; and Kemamide W-20, N,N-ethylenebisoleamide.

Dialkanolamides include those of formula XIII:

$$R_{13}CON(CH_2CH_2OH)_2 \qquad (XIII)$$

wherein $R_{13}$ is a linear or branched aliphatic group of from about 7 to about 21 carbon atoms, and preferably from about 11 to about 17 carbon atoms, and is saturated or unsaturated with one or two olefinic bonds. Illustrative are Nitrene L-90 (Malmstrom Chemical), lauroyl diethanolamide; Nitrene L-76, lauroyl/myristoyl (70:30) diethanolamide; and Nitrene NO, oleoyl diethanolamide; and, Ninol 1285 (Stepan Chemical Co.). Representative of ethoxylated derivatives of formula XIII are the Amidoxes (Stepan Chemical Co.), e.g., Amidox C-2.

Suitable ethoxylated phenols include those of formula XIV:

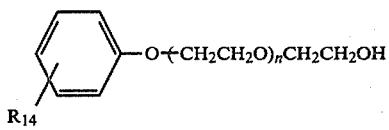

(XIV)

wherein $R_{14}$ is a linear or branched alkyl group of from about 6 to about 16 carbon atoms, preferably from about 8 to about 10 carbon atoms, and n is from about 1 to about 100, and preferably from about 2 to about 75. An illustrative ethoxylated phenol is Triton X-705, octylphenoxy polyethoxy ethanol wherein n is about 70.

The amphoteric imidazoline surfactants which are useful in the process of this invention include those of formula XV:

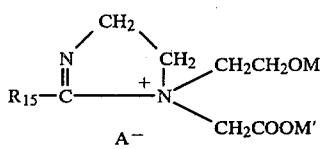

(XV)

wherein $R_{15}$ is an aliphatic group of from about 7 to about 21 carbon atoms, preferably from about 11 to about 17 carbon atoms, and M and M' are H, Na+ or K+ and A− is Cl−, Br− or OH−. Examples of such surfactants are Miranol DM (Miranol Chemical Co. Inc.), where $R_{15}$ is heptadecyl, M and M' are H, and A− is Cl−; and Amphoterge K (Lonza Inc.), where R is undecyl and M and M' are Na+ and A− is OH−. This type of imidazolinium salt, in contrast to other surfactants of this invention, is capable by itself of dispersing ethylene-vinyl acetate (but not polyethylene) without added strong base promoter.

A second type of useful amphoteric imidazoline are those of formula XVI:

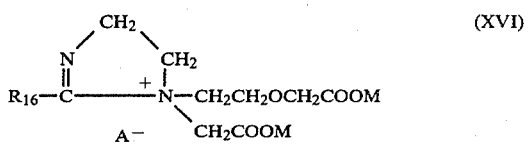

(XVI)

wherein $R_{16}$, M and A− have the same meaning as in formula XV. Illustrative imidazolines are Miranol C2M, where R is cocoyl, M and M' are Na+, and A− is OH−; and Amphoterge K-2, where $R_{16}$ is undecyl, M and M' are again Na+, and A− is OH+.

A third type of amphoteric imidazoline, specifically useful for the dispersion of ethylene-vinyl acetate copolymer, is that of formula XVII:

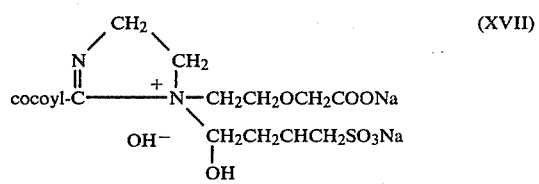

(XVII)

This imidazoline corresponds to that of Amphoterge SB.

Betaines which are useful herein include those of formula XVIII:

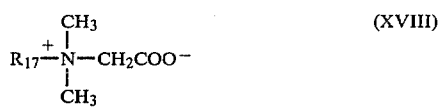

(XVIII)

wherein $R_{17}$ is a linear or branched aliphatic group of from about 8 to about 22 carbon atoms, preferably from about 12 to about 18 carbon atoms, and is saturated or unsaturated with one or two olefinic bonds. Illustrative of such betaine surfactants are Standapol AB-45 (Henkel Inc. USA), where $R_{17}$ is cocoyl; Velvetex BC (Textilana Corp.), a surfactant of like structure; and Varion SDG (Ashland Chemical Co.) where $R_{17}$ is stearyl.

A few of the many surface active agents which can be advantageously utilized in the present dispersion process are described in Table I. Numerous other useful surface active agents are set forth in McCutcheon's *Detergents & Emulsifiers*, North American Edition, 1976. As is fully understood by those skilled in the art, commercially-available surfactants are normally composed of mixtures of compounds of the designated formulas rather than specific compounds falling within the said formulas. Either the commercial surfactants or specific surfactant compounds can be employed, as long as they include the specified functional groups characteristic of the described classes of surfactants.

TABLE I

| Surface Active Agent | Manufacturer | Chemical Class | Type | Formula |
|---|---|---|---|---|
| Triton X-301 | Rohm & Haas Co. | Sulfate | Anionic | Sodium salt of alkaryl polyether sulfate |
| Polystep B-5 | Stepan Chemical Co. | Sulfate | Anionic | Sodium lauryl sulfate |
| Polystep B-12 | Stepan Chemical Co. | Sulfate | Anionic | Sodium lauryl ether sulfate |
| Witcolate 1050 | Witco Chemical Co. | Sulfate | Anionic | Sodium lauryl ether sulfate |
| Triton X-200 | Rohm & Haas | Sulfonate | Anionic | Sodium salt of |

TABLE I-continued

| Surface Active Agent | Manufacturer | Chemical Class | Type | Formula |
|---|---|---|---|---|
| | Co. | | | alkaryl polyether sulfonate |
| Bioterge AS-40 | Stepan Chemical Co. | Sulfonate | Anionic | Sodium salt of alpha olefin sulfonate |
| Ultra SXS | Witco Chemical Corp. | Sulfonate | Anionic | Sodium xylene sulfonate |
| Hamposyl C-30, L-95 and M-30 | Hampshire Chemical | Sarcosinate | Anionic | Sodium cocoyl sarcosine (C-30) Sodium lauroyl sarcosine (L-95) Sodium myristoyl sarcosine (M-30) |
| Igepon CN-42 T-33, TM-43, TN-74 and TC-42 | GAF Corp. | Taurate | Anionic | Sodium N-cyclohexyl-n-palmitoyl-taurate (CN-42) Sodium N-methyl-N-oleoylturate (T-33) Sodium salt of (N-methyl-N-myristoyl taurine) (TM-43) Sodium N-methyl-N-palmitoyl taurate (TN-74) Sodium N-coconut acid-N-methyl taurate (TC-42) |
| Igepon AC-78 and AP-78 | GAF Corp. | Isethionate | Anionic | Coconut oil acid ester of sodium istehionate (AC-78) Oleic acid ester of sodium isethionate (AP-78) |
| Fosfamide N | Textilana Corp. | Fatty amido phosphate | Anionic | Complex fatty acid phosphate |
| Hallcomid M-12 | The C.P. Hall Co. | Fatty amide derivative | Nonionic | N,N-dimethyl lauramide |
| Ceranine HC, HCA and PNS | Sandoz Colors and Chemicals | Fatty amide derivative | Cationic | Fatty amides |
| Kemamide W-40 | Humko Sheffield Chemical | Fatty amide derivative | Nonionic | N,N-ethylenebis-stearamide |
| Pave 192 | Cincinnati Milacron | Amido amine | Cationic | Amido amine |
| Rycofax 618 | Ryco, Inc. | Amido amine | Cationic | Fatty amide |
| Doxameen | Whitestone Chemical Co. (BASF-Wyndotte) | Higher Alkyl amine | Nonionic | Ethoxylated amine |
| Avitex | DuPont Co. | Higher alkyl amine | Cationic | Complex higher alkylamine |
| Permalene A-141 | Refined-Onyx Div. | Higher alkyl amine | Cationic | Ethoxylated amine |
| Amphoterge SB and NEX | Lonza, Inc. | Substituted imidazoline | Amphoteric | Substituted imidazolines |
| Miranol C2M, DM | Miranol Chemical Co., Inc. | Substituted imidazoline | Amphoteric | Dicarboxylic coconut imidazoline derivative, sodium salt (C2M) Condensed stearic acid imidazoline derivative (DM) |
| Schercozolines C, L, B, I, M, S and O | Scher Chemicals, Inc. | Substituted Imidazoline | Cationic | Substituted imidazoline from coconut fatty acids (C) Substituted imidazoline from lauric acid (L) Substituted imidazoline |

TABLE I-continued

| Surface Active Agent | Manufacturer | Chemical Class | Type | Formula |
|---|---|---|---|---|
| | | | | from C20 to C22 fatty acids (B) Substituted imidazoline from isostearic acid (I) Substituted imidazoline from myristic acid (M) Substituted imidazoline from stearic (S) Substituted imidazoline from oleic acid (O) |
| Varisoft 475 | Ashland Chemical | Substituted imidazoline | Cationic | Methyl (1) alkylamidoethyl (2) alkylimidazolinium metho sulfate |
| Rewopon AM-2C, AM-2C/SF, AM-C and AM-CA | Rewo Chemicals, Inc. | Substituted imidazoline | Amphoteric | Coco, imidazoline derivatives |
| T.D. Conc. | Refined-Onyx Div. | Substituted imidazoline | Cationic | Imidazolinium type |
| Standapol | Henkel Inc. U.S.A. | Substituted betaine | Amphoteric | Coco betaine |
| Lonzaine CO and CS | Lonza, Inc. | Substituted betaine | Amphoteric | Coco amido betaine (CO) Fatty sulfobetaine (CS) |
| Velvetex BC | Textilana Corp. | Substituted betaine | Amphoteric | Coco dimethyl ammonium carboxylic acid betaine |
| Varion CADG, CDG and SDG | Ashland Chemical | Substituted betaine | Amphoteric | Coco amido betaine (CADG) Coco betaine (CDG) Stearyl betaine (SDG) |
| Schercotaine CAB, CB, IAB, LAB, MAB, MB, OAB, OB, PAB, SAB and SCAB | Scher Chemicals Inc. | Substituted betaine | Amphoteric | Coconut amido betaine (CAB) Coco betaine (CB) Isostearyl amido betaine (IAB) Lauryl amido betaine (LAB) Myristyl amido betaine (MAB) Myristyl betaine (MB) Oleyl amido betaine (OAB) Oleyl betain (OB) Palmityl amido betaine (PAB) |
| Schercotaine SAB and SCAB | Scher Chemicals Inc. | Substituted betaine | Amphoteric | Stearyl amido betaine (SAB) Sulfo-coco amide betaine (SCAB) |
| Nitrene NO and L90 | Malstrom Chemical | Ethoxylated alkylolamide | Nonionic | Oleoyl diethanolamide (NO) Lauroyl diethanolamide (L90) |
| Amidox C2 | Stepan Chemi- | Ethoxylated | Nonionic | Ethoxylated |

TABLE I-continued

| Surface Active Agent | Manufacturer | Chemical Class | Type | Formula |
|---|---|---|---|---|
| and C5 | cal Co. | alkylol-amide | | alkylolamides |
| Ninol 1285 | Stepan Chemical Co. | Ethoxylated alkylol-amide | | Coconut fatty acid amide |
| Triton X-705 | Rohm & Haas Co. | Ethoxylated phenol | Nonionic | Octylphenoxy polyethoxy ethanol |
| Brij 78 | ICI United States Inc. | Ethoxylated fatty ether | Nonionic | Polyoxy-ethylene (20) stearyl ether |

The water soluble salt for optional use herein is a substantially neutral salt. For the purpose of this invention, such a salt is defined as one that, at a 1.0 Molar concentration in pure water at 20° C. produces a solution, the pH of which is between 4 and 9. The cation of the salt is derived from an alkali metal or any other metal that does not form insoluble substances with the above-disclosed surfactant selected, at the operating temperature of the process i.e., is inert to the surfactant employed. The cation may be monovalent, divalent or of higher valence. The nature of the anion of the salt does not appear to be critical; the anion can be for example, fluoride, chloride, bromide, iodide, bisulfate, sulfate, phosphate, hydrogen phosphate, dihydrogen phosphate, nitrate, bicarbonate, carbonate, acetate or propionate anion, or similar such anions. Mixture of salts can be employed.

Specific examples of the water-soluble salts are lithium fluoride, lithium chloride, sodium bisulfate, sodium sulfate, sodium hydrogen phosphate, ammonium chloride, potassium dihydrogen phosphate, sodium carbonate, sodium acetate, sodium propionate, etc. The cation of the soap and the water-soluble salt may be the same or different.

The expression "strong base" as employed herein refers to alkali metal hydroxides, e.g., sodium hydroxide and potassium hydroxide, and salts of alkali metals which in a 1.0 molar solution, exhibit a pH of about 11.0 or higher, e.g., trisodium phosphate and sodium carbonate. Sodium hydroxide is especially preferred.

The dispersing systems of the present invention, by functioning effectively from temperatures as low as the melting point of low density polyethylene, i.e., about 115° C. up to as high as 325° C., are not limited to the dispersion of low molecular weight low density polyethylenes. For example, high molecular weight low density polyethylenes, linear polyethylene, polypropylene, polyvinyl chloride, ethylene-vinyl acetate copolymers, ethylene-allyl alcohol copolymers, nylon, and the like which either do not melt or which exhibit melt flow rates below about 15 at temperatures below 160° C. can be readily dispersed by means of the subject novel dispersing systems to dispersions substantially devoid of particles larger than 500 microns and wherein the particles have a relatively narrow size range. Where it is desired to prepare the finest dispersion of a given polymer, the dispersion temperature should be such that the resin being dispersed exhibits a melt flow rate of greater than 15, and more preferably, greater than 20. Where larger average particle sizes are desired or acceptable, however, dispersion temperatures may be employed, still in combination with only relatively mild agitation, at which the polymer exhibits a melt flow rate appreciably lower than 15, for example, as low as about 2.

The temperature of operation is dependent upon the melting point, melt flow properties, decomposition temperature, and desired fineness of dispersion of the selected synthetic organic thermoplastic resin. While such resins can be dispersed at temperatures commencing with their respective melting points, increases in dispersion temperature beyond the melting point and up to the decomposition of the resins are generally accompanied by corresponding increases in the fluidity of the molten resin. As the fluidity of the melt increases, the dispersions generally tend to develop lower average particle sizes without requiring increases in agitation effort.

The flow properties of a molten polymeric resin are closely related to its molecular weight. As the molecular weight of a given type of polymer is increased, its fluidity at a given temperature tends to lessen, that is, the polymer tends to offer greater resistance to breakdown to small particles. On the other hand, the melting point of the polymer varies little with changes in molecular weight. Consequently, while two polymers of the same type, e.g., low density polyethylene, but of different molecular weights may exhibit the same melting point and therefore be dispersable commencing at the same temperature, the higher molecular weight polymer will require high dispersion temperatures for the same agitation effort to achieve a fineness of dispersion equivalent to that of the polymer of lower molecular weight.

A convenient measure of the fluidity or flow of a thermoplastic polymer is afforded by the melt flow rate value as outlined under ASTM test method D1238 (Condition E unless otherwise specified).

The dispersing apparatus or device may be any device capable of delivering at least a moderate amount of shearing action under elevated temperatures and pressures to a liquid mixture. Suitable, for example, are conventional autoclaves equipped with conventional propeller stirrers. Propellers designed to impart greater shear to the mixture tend to improve the recovered yield of pulverulent polymer, but with little effect on the particle size and distribution of recovered polymer. The particle size and distribution are somewhat dependent on the stirring rate, higher stirring speeds resulting in finer and narrower dispersions until an optimum speed is reached above which there is little change. The overall recovery yield of pulverulent polyolefin from the dispersion is dependent upon the duration of stirring. For a given type and rate of stirring, a period of stirring exists within which maximum recoverable yields of pulverulent polyolefins result. Either shorter or longer periods of shearing result in lower recoverable yields. Preferred stirring periods generally will range from about 1 to 20 minutes, and preferably from about 5 to 15 minutes. It will be understood, however, that the stirring rates and periods will depend upon the type of equipment utilized. While the rate and duration of agitation affect particle size and distribution and recoverable yields of pulverulent polymer, these variables can be readily optimized for any given polyolefin through simple, routine experimentation.

In carrying out the subject process, the selected synthetic organic thermoplastic polymer is first contacted with water and the dispersing system. It is a particularly advantageous feature of this invention that the dispersing system need not be incorporated into the polymer prior to the introduction of the water by such means as milling and the like, but may be introduced into the dispersing apparatus simultaneously with the other ingredients or as a solution in the aqueous phase. If desired, the dispersion process may be operated in a continuous manner, in which case it is convenient to premix the desired ratio of dispersing system, water, polymer, and optional salt, and introduce this mixture continuously to the reactor while continuously removing from another part of the reactor the product dispersion.

The amount of water used in relation to the polymer dispersed generally ranges from about 0.1 to about 10.0 parts by weight of water per part of normally solid polymer. Higher ratios are operable but uneconomical whereas lower ratios, although usable, present operational difficulties. The preferred range is between about 0.2 and about 5.0 parts per part of polymer.

The amount of surface active agent component of the dispersing system should, when combined with a dispersion promoting amount of strong base, be sufficient to provide a dispersion of the resin in the water under the selected conditions. Very good dispersions can be obtained at amounts within the range of from 2 to about 25 weight parts surface active agent per 100 weight parts of resin and as such, these amounts being preferred. There is no upper limit of the amount of surface active agent which can be employed except that exceeding the amount beyond that required to provide an acceptable dispersion may be economically wasteful.

The amount of strong base which must be added to the surface active agent to promote successful dispersion can vary over relatively wide limits and is to some extent dependent upon the nature of the resin being dispersed, the nature of the base, the operational conditions of the dispersion process, the nature and amount of other materials in the aqueous dispersion media and similar factors. The amount of strong base which is added must not, under the conditions of the dispersion process selected, result in any significant amount of chemical change, to the polymer, i.e., saponification in the case of EVA copolymer. Moreover, it has been observed that the addition of such amounts of strong base as would result in appreciable saponification of an EVA copolymer will interfere with the effectiveness of the surface active agents herein. The optimum dispersion promoting amount of strong base can be readily determined for a given dispersion process employing simple and routine procedures well understood by those skilled in the art. In general, the amount of strong base which will satisfactorily promote dispersion of the resin can range from about 0.1 to about 5.0 weight percent of the water and advantageously, from about 0.2 to about 1.5 weight percent of the water.

Similarly, the optimum amount of neutral salt which can optionally be added by way of further improving the efficacy of the dispersing systems herein can be readily determined for a particular dispersion process using simple techniques. For many dispersions, the amount of neutral salt can range from about 0.2 to about 7.5 weight percent of the water and advantageously, from about 0.4 to about 4.5% weight percent of the water.

The temperature for forming the hot aqueous resin dispersion can range from about 100° C. to about 270° C. with temperatures of from about 150° C. to about 250° C. being preferred. The pressure is autogenous. The rate of stirring is not critical and can vary from about 1200 to about 4000 rpm with from about 1800 to about 3800 rpm being preferred. Stirring rates outside these ranges can be employed with specific dispersion systems with good results. The dispersion times frequently range from about 1 minute to about 1 hour with times of from about 5 to about 15 minutes being preferred.

The dispersions resulting from the above process are compositions comprising a dispersion of a normally solid synthetic organic polymeric thermoplastic resin in water in the presence of a minor amount of dispersing system and can be utilized in the coating of metal or paper, in polish formulations, in paint formulations, for textile sizing and waterproofing, for coating fibers, etc.

If it is desired to recover the dispersed polymer particles from the aqueous media, the temperature of the dispersion may be lowered to about 100° C., and the polymer separated from the aqueous phase in the form of discrete particles by filtration, evaporation of the water, and the like. If the temperature of the subject dispersion is lowered to below the boiling point of water, the finely-divided polymer can be recovered by simple atmospheric filtration. The tackiness of some polymers of the present invention such as EVA copolymers containing more than 30% vinyl acetate by weight can complicate their recovery from dispersion in the particulate form using conventional techniques such as filtration since by their nature particles of EVA copolymer with such a vinyl acetate content tend to coalesce upon filtration. This difficulty can, however, be easily overcome by adding a parting agent such as calcium stearate to the dispersion before filtration. If polyethylene is dispersed and recovered, no such precautions are necessary. The polymer filter cake is washed one or more times with cold water, preferably deionized or distilled to remove residual amounts of surface active agent, base and salt, if present. It is an outstanding feature of this invention that the finely-divided polymer recovered after several washings with water has comparatively low levels of residual dispersing system associated therewith and, consequently, requires no subsequent treatment to remove or inactivate the dispersing system residues where the presence of such residues would be considered undesirable. The aqueous filtrate and washings contain substantially all of the dispersing system originally added, and thus can be recycled to act as the dispersion medium for subsequent batches of polymer.

Drying of the recovered finely-divided polymer yields a free-flowing powder of fine particle size and narrow particle size distribution. Generally, all of the dispersed particles have diameters less than about 500 microns. By varying the composition of the subject novel dispersing agents and the ratio of polymer to water, average particle sizes ranging from about 300 microns to as low as 10 microns or below can be obtained. Especially preferred are particles of narrow size distribution wherein the average particle size is less than about 150 microns, and more desirably less than about 50 microns, but not less than about 10 microns.

The finely-divided polymers of this invention are superior in powder form for static or fluidized dip coating, spraying, dusting, and flame spraying applications as well as for preparing stable dispersions in water or some other medium for use in roller, dip, or spray coating. The relatively high molecular weight polymers of this invention also find use in the preparation of heat resistant coatings, in the preparation of molded or formed shapes by powder or slush molding techniques, and in the preparation of foams in combination with conventional blowing agents.

The following examples will further illustrate this invention without limitation. All parts are by weight unless otherwise indicated.

The dispersion apparatus comprised a cylindrical 1-liter, 4-inch diameter pressure reactor (Parr Instrument Co.) equipped with a thermowell, a safety head, a stirrer bearing and shaft, and a pressure gauge. Power was supplied to the stirrer by means of a fractional horsepower motor. The stirring propeller comprised two curved-tooth turbine-type discs (3-inch diameter).

The resin powders of the examples were analyzed by one of two procedures. In accordance with one procedure, the powders were sieved by means of a Roto-Tap sieve using appropriate ASTM screens. The results of the sieving analyses are expressed in weight percent. The other analytical procedure involved the use of an electronic Coulter counter and was particularly useful where a more precise count was desired and with dispersions such as latices where sieving and microscopic counts were impractical. The Coulter counter determines the number and volume of particles suspended in an electrically conductive liquid as these particles flow singularly through a small aperture having an immersed electrode on each side. As a particle passes through the aperture, it displaces electrolyte within the aperture and thereby momentarily changes the resistance between the electrodes, causing a voltage pulse of magnitude proportional to the volume of the particle. The pulses for the particles of the sample are electrically amplified, scaled, and counted. From these counts, generally made on several million particles, accurate distribution curves of both number and weight percent can be established. Results are expressed in terms of the largest and smallest particles counted, the 25, 50 and 75 weight percentile size, and the number average particle size.

EXAMPLE I 150 parts of a polyethylene having a density of 0.915 g/cc and a melt index (ASTM D1238-65T Condition E) of 22.0 g/10 min., in the form of pellets, 75 parts of Triton X-301, the sodium salt of alkyl aryl polyether sulfate as a 20% aqueous dispersion manufactured by Rohm and Haas Co., 2 g. sodium hydroxide, and 390 ml deionized water were charged to the reactor. Heat was applied until the temperature of the mixture reached 200° C. at a pressure of 235 psi. Stirring was then started at a rate of 3700 rpm and continued during the cooling period which started immediately after the temperature had reached 200° C. and lasted about 15 minutes until the temperature had dropped below 100° C. The residual pressure was then bled off, the obtained dispersion was suction-filtered on a Buchner funnel fitted with a #541 Whitman filter paper. The residue was washed thoroughly with water and dried for 4 hours at 60° C. The dried polyethylene residue comprised 150 parts of a fine, white powder having a melt index of 22.0 g/10 min. at 190° C. A sieve analysis gave the following particle size distribution: 12.0 weight percent passing 106 microns, 72.5 weight percent passing 149 microns, 80.1 weight percent passing 250 microns, 89.0 weight percent passing 420 microns and 100 weight percent passing 500 microns.

The same operating conditions of the above run were employed using the same polyethylene and the same type surfactant but omitting the sodium hydroxide. No dispersion resulted, the polymer being recovered as a solid mass wrapped around the stirrer.

In the same manner as described above, the efficacy of other surface active agents was evaluated with the same polyethylene in the presence of strong base. These surface active agents as well as the appearance of the resulting dispersions are set forth in Table II below.

TABLE II

Charge: 450 ml water*
150 g NA-202[1]
2 g NaOH
Surface active agent as indicated
Temperature 200° C.

| Name | Type | Amt. g | Yield % | Description of Particles |
|---|---|---|---|---|
| Amidox C-2[2] | Nonionic | 15.0 | 100 | Microscopic spheres |
| Hallcomid M-12[3] | Nonionic | 15.8 | 90 | Small chips |
| Hallcomid M-18 | Nonionic | 15.8 | 100 | Microscopic spheres |
| Brij 785 | Nonionic | 15.0 | 100 | Chips |
| Pave 192[6] | Cationic | 15.0 | 100 | Very fine needles |
| Ceranine HC[7] | Cationic | 15.0 | 100 | Microscopic spheres |
| Ceranine HCA[7] | Cationic | 15.0 | 100 | Microscopic spheres |
| Igepon CN-42[8] | Anionic | 62.6 | 100 | Microscopic spheres |
| Triton X-200[9] | Anionic | 53.6 | 90 | Small chips |
| Avitex NA[10] | Cationic | 15.0 | 95 | Microscopic spheroidal shapes, small needles |
| Schercozoline B[11] | Cationic | 15.0 | 100 | Microscopic spheres |
| Nitrene NO[12] | Nonionic | 15.0 | 100 | 19% < 106 μ, 82% < 420μ |

TABLE II-continued

Charge: 450 ml water*
150 g NA-202[1]
2 g NaOH
Surface active agent as indicated
Temperature 200° C.

| Name | Type | Amt. g | Yield % | Description of Particles |
|---|---|---|---|---|
| Ninol 1285[13] | Nonionic | 15.0 | 85 | Small needles + chips |

FOOTNOTES
[1]Petrothene 202/U.S. Industrial Chemicals Co. polyethylene, melt index (ASTM D1238-65T Condition E): 22.0 g/10 min; density .915 g/cc
[2]Ethoxylated alkylolamide (Stepan Chem. Company)
[3]N,N dimethyl lauramide (C.P. Hall Co.)
[4]N,N dimethyl stearamide (C.P. Hall Co.)
[5]Polyethylene stearyl ether (ICI United States, Inc.)
[6]Amido-amine (Cincinnati Milacron)
[7]Fatty amide derivatives (Sandoz Colors & Chemicals)
[8]Sodium N cyclohexyl-N-palmitoyl taurate (24%) (GAF Corp.)
[9]Sodium salt of alkyl aryl polyether sulfonate (28%) (Rohm & Haas Co.)
[10]Complex higher alkylamine composition (DuPont Co.)
[11]Substituted imidazoline from $C_{20}$-$C_{22}$ fatty acids (Scher Chemicals, Inc.)
[12]Oleoyl diethanolamide (Malmstrom Chemical Co.)
[13]Fatty acid alkanolamide (Stepan Chemical Co.)
*Amounts of water were reduced when the surface active agents contained large amounts of water.

EXAMPLE II

A series of dispersions were prepared from an EVA copolymer according to the procedure described in Example I employing a variety of surface active agents.

The resulting dispersions were examined for yield expressed as percent of polymer dispersed, particle shape and size. The latter was done with the help of an optical microscope of 780 times magnification. In order to establish the particle size range for fine dispersions, particle size analysis was made on the Coulter Counter. The resulting size distributions in number percent were recalculated to express weight percent distributions which are set forth in Table III below. The same operating condition of the above runs were employed using the same EVA copolymer and the same type surfactant but omitting the presence of sodium hydroxide. No dispersion was obtained, the polymer being recovered in a solid mass wrapped around the stirrer.

TABLE III

Charge:
EVA Copolymer: 150 g Vynathene EY 901[14]
Water: 450 ml*
Sodium Hydroxide: 2.0 g
Surface Active Agent: as indicated
Temperature: 200° C.

| Surfactant | | | | Product | | | | |
|---|---|---|---|---|---|---|---|---|
| Name | Type | Amt. g | Yield % | Largest Particle (Microns) | Smallest Particle (Microns) | 25 wt. % of particle below (Microns) | 50 wt. % of Particle below (Microns) | 75 wt. % of Particles below (Microns) |
| Triton X-200[15] | Anionic | 53.6 | 100 | 161 | 8 | 53 | 85 | 114 |
| Triton X-301[16] | Anionic | 75.0 | 100 | very fine spherical particles | | | | |
| Sodium lauryl sulfate | Anionic | 15.0 | 100 | chips and small particles | | | | |
| Bio-Soft N-21[17] | Anionic | 25.0 | 100 | very fine needles and chips | | | | |
| Amidox C-2[18] | Nonionic | 15.0 | 100 | fine needles and chips | | | | |
| Triton X-705[19] | Nonionic | 15.0 | 95 | coarse dispersion | | | | |
| Doxameen 87[20] | Nonionic | 15.0 | 100 | fine, rounded particles | | | | |
| Hallcomid M-18[21] | Nonionic | 15.8 | 100 | fine spherical and spheroidal particles | | | | |
| Lonzaine CO[22] | Amphoteric | 43.0 | 100 | extremely fine threads and spherical particles | | | | |
| Brij 78[23] | Nonionic | 15.0 | 100 | small chips | | | | |
| Nitrene NO[24] | Nonionic | 15.0 | 100 | 161 | 8 | 76 | 92 | 114 |
| Schercozoline-B[25] | Cationic | 14.0 | 100 | extremely fine spherical particles | | | | |
| Ceranine HC[26] | Cationic | 15.0 | 100 | very fine spherical particles | | | | |
| Ceranine HCA[26] | Cationic | 15.0 | 100 | extremely fine spherical particles | | | | |
| Velvetex BC[27] | Amphoteric | 25.4 | 100 | extremely fine particles | | | | |
| Standapol AB —45[28] | Amphoteric | 33.5 | 100 | 161 | 20 | 59 | 73 | 113 |
| Varion SDG[29] | Amphoteric | 30.0 | 100 | extremely fine particles | | | | |
| Rewopon AM-C[30] | Amphoteric | 40.5 | 100 | extremely fine particles | | | | |
| Avitex NA[31] | Cationic | 15.0 | 100 | 161 | 10 | 85 | 120 | 143 |
| Igepon AC-78[32] | Anionic | 18.7 | 100 | microscopic spheres & threads | | | | |
| Igepon CN-42[33] | Anionic | 62.5 | 100 | submicron needles and spheres | | | | |
| Ninol 1285[34] | Nonionic | 15.0 | 100 | 161 | 20 | 81 | 102 | 122 |

TABLE III-continued

Charge:
EVA Copolymer: 150 g Vynathene EY 901[14]
Water: 450 ml*
Sodium Hydroxide: 2.0 g
Surface Active Agent: as indicated
Temperature: 200° C.

| Surfactant | | | | | | Product | | |
|---|---|---|---|---|---|---|---|---|
| Name | Type | Amt. g | Yield % | Largest Particle (Microns) | Smallest Particle (Microns) | 25 wt. % of particle below (Microns) | 50 wt. % of Particle below (Microns) | 75 wt. % of Particles below (Microns) |
| Bioterge AS-40[35] | Anionic | 43.0 | 100 | 161 | 8 | 85 | 116 | 150 |

FOOTNOTES
*Amounts of water were reduced when the surface active agent contained large amounts of water.
[14]Ethylene-vinyl acetate copolymer of about 40% vinyl acetate content having a melt flow rate (ASTM D1238-65T) of 7.4 g/10 min. (U.S. Industrial Chemicals Co.)
[15]Sodium salt of alkylaryl polyether sulfonate (28%) (Rohm & Haas Co.)
[16]Sodium salt of alkylaryl polyether sulfate (20%) (Rohm & Haas Co.)
[17]Salt of a linear alkylate (60%) (Stepan Chemical Co.)
[18]Ethoxylated alkylolamides (Stepan Chemical Co.)
[19]Octylphenoxy polyethoxy ethanol (Rohm & Haas Co.)
[20]Oxyethylated fatty amine (Whitestone Chemical Corp./BASF)
[21]N,N-dimethyl stearamide (95%) (C.P. Hall Co.)
[22]Coco amido betaine (Lonza, Inc.)
[23]Polyoxyethylene ethyl ether (ICI United States, Inc.)
[24]Oleoyl diethanolamide (Malmstron Chemical)
[25]Substituted imidazoline from $C_{20}$-$C_{22}$ fatty acids (Scher Chemicals, Inc.)
[26]Fatty amide derivatives (Sandoz Colors and Chemicals)
[27]Coco dimethyl ammonium carboxylic acid betaine (59%) (Textilana Corp.)
[28]Coco betaine (45%) (Henkel, Inc. USA)
[29]Stearyl betaine (50%) (Ashland Chemical)
[30]Coco imidazoline derivative (37%) (Rewo Chemicals, Inc.)
[31]Complex higher alkylamine composition (DuPont)
[32]Coconut-oil acid ester of sodium isethionate (GAF Corp.)
[33]Sodium N-cyclohexyl-N-palmitoyl-taurate (GAF Corp.)
[34]Fatty acid alkanolamide (Stepan Chemical Co.)
[35]Sodium salt of alpha olefin sulfonate (35%) (Stepan Chemical Co.)

EXAMPLE III

In a series of runs carried out according to the procedure described in Example 1 and summarized in Table IV below, dispersions of EVA copolymer were evaluated with a number of surface active agents. In several runs, sodium hydroxide was replaced by sodium chloride. In the one run where sodium chloride as dispersion promotor provided a fine dispersion, relatively large quantities of this salt were required to be effective.

TABLE IV

Charge: Water: 450 ml*
Polymer: 150 g as indicated
Surface Active Agent Dispersion: as indicated
promoter as indicated
Temperature: 200° C.

| Polymer | | Surfactant | | | Promoter | | Product | |
|---|---|---|---|---|---|---|---|---|
| Type | Amt. g | Name | Type | Amt. | NaOH g | NaCl g | Yield % | Appearance |
| EY-901[36] | 150 | Schercozoline B[37] | Cationic | 15.0 | — | — | — | No dispersion |
| EY-901 | 150 | Schercozoline B | Cationic | 15.0 | 2 | — | 100 | Extremely fine dispersion |
| EY-901 | 150 | Schercozoline B | Cationic | 15.0 | — | 2 | ≈90 | Flat chips 0.5 cm. |
| EY-901 | 150 | Schercozoline B | Cationic | 15.0 | — | 17.5 | — | Fused flat pieces |
| NA-202[38] | 150 | Schercozoline B | Cationic | 15.0 | — | — | — | No dispersion |
| NA-202 | 150 | Schercozoline B | Cationic | 15.0 | 2 | — | 100 | Very fine dispersion |
| NA-202 | 150 | Schercozolin B | Cationic | 15.0 | — | 17.5 | — | No dispersion |
| EY-901 | 150 | Igepon CN-42[39] | Anionic | 62.6 | — | — | — | No dispersion |
| EY-901 | 150 | Igepon CN-42 | Anionic | 62.6 | 2 | — | 100 | Very fine dispersion |
| EY-901 | 150 | Igepon CN-42 | Anionic | 62.6 | — | 17.5 | 100 | Macroscopic chips |
| NA-202 | 150 | Igepon CN-42 | Anionic | 62.6 | — | — | ≈85 | Large chips |
| NA-202 | 150 | Igepon CN-42 | Anionic | 62.6 | 2 | — | 100 | Fine dispersion |
| NA-202 | 150 | Igepon CN-42 | Anionic | 62.6 | — | 2 | 85 | Large chips |
| NA-202 | 150 | Igepon CN-42 | Anionic | 62.6 | — | 17.5 | 80 | Small and large chips |
| EY-901 | 150 | Pave 192[40] | Cationic | 15.0 | — | — | — | No dispersion |
| EY-901 | 150 | Pave 192 | Cationic | 15.0 | 2 | — | 100 | Fine dispersion |
| EY-901 | 150 | Pave 192 | Cationic | 15.0 | — | 2 | — | No dispersion |
| EY-901 | 150 | Pave 192 | Cationic | 15.0 | — | 17.5 | 100 | Fine dispersion |
| NA-202 | 150 | Pave 192 | Cationic | 15.0 | — | — | — | No dispersion |
| NA-202 | 150 | Pave 192 | Cationic | 15.0 | 2 | — | 100 | Sl. agglomerated fine needles |
| NA-202 | 150 | Pave 192 | Cationic | 150 | — | 2 | — | No dispersion |

TABLE IV-continued

Charge: Water: 450 ml*
Polymer: 150 g as indicated
Surface Active
Agent Dispersion: as indicated
promoter as indicated
Temperature: 200° C.

| Polymer | | Surfactant | | Promoter | | Product | |
|---|---|---|---|---|---|---|---|
| Type | Amt. g | Name | Type | Amt. | NaOH g | NaCl g | Yield % | Appearance |
| NA 202 | 150 | Pave 192 | Cationic | 15.0 | — | 17.5 | ≈75 | Large chunks |

FOOTNOTES
*Amount of water was reduced when the surface active agent contained large amounts of water.
[36]Vynathene EY-901 (U.S. Industrial Chemicals Co.) EVA copolymer of about 40% vinyl acetate content with a melt flow rate (ASTM D1238-65T Condition E) of 7.4 g/10 min.).
[37]Substituted imidazoline from $C_{20}$-$C_{22}$ fatty acids (Scher Chemicals, Inc.)
[38]Petrothene 202 polyethylene (U.S. Industrial Chemicals Co.) melt index (ASTM D1238-65T Condition E) of 22.0 g/10 min.; density: .915 g/cc.
[39]Sodium N-cyclohexyl-N-palmitoyltaurate (24%) (GAF Corp.)
[40]Amido-amine (Cincinnati Milacron)

EXAMPLE IV 150 parts of a linear polyethylene having a density of 0.962 g/cc and a melt index (ASTM D1238-65T Condition E) of 28.0 g/10 min. in the form of pellets were dispersed according to the procedure described in Example 1. 75 parts of Triton X-301 were used together with 390 ml water and 4 g sodium hydroxide. 100% of the polyethylene was dispersed in the form of microscopic spheres. The dried material had the following particle size distribution: 24.2% passed 106μ, 64.6% passed 149μ, 99.3% passed 250μ and 99.9% passed 420μ. The same operating conditions of the above run were employed using the same polyethylene but different types of surface active agents. The finding of these dispersion runs are set forth in Table V below.

TABLE V

Charge: 450 ml water*
150 g polyethylene[41]
Surface active agent as indicated
Sodium hydroxide as indicated
Temperature: 200° C.

| Surfactant | | Promoter | Product | | | | |
|---|---|---|---|---|---|---|---|
| | | | | Sieve analysis of particles in wt. percent with a diameter below 500 microns | | | |
| Name | Type | Amt. g | NaOH g | Yield % | <106 | 106–149 | 149–250 | 250–420 |
| Nitrene NO[42] | Nonionic | 15 | 2 | 95 | micro - macroscopic spheres | | | |
| Avitex NA[43] | Cationic | 60 | 4 | 65 | 6.4 | 16.1 | 70.8 | 6.6 |

*Amounts of water were reduced when the surface active agent contained large amounts of water.
[41]Linear polyethylene having a density of 0.962 g/cc and a melt index (ASTM D1238-65T Condition E) if 28.0 g/10 min.
[42]Oleoyl diethanolamide (Malmstrom Chemical Co.)
[43]Complex higher alkylamine composition (DuPont)

What is claimed is:

1. A process for preparing in a finely divided form a solid organic polymeric thermoplastic resin which comprises:
   (a) agitating a mixture of the resin while in the molten state, a dispersion-forming amount of water, and a dispersing system comprising a dispersing amount of a surface active agent which is normally incapable of forming a dispersion of said resin in the absence of strong base in combination with a dispersion promoting amount of strong base to provide an aqueous dispersion of the resin said dispersion being formed in the absence of discharge of the hot dispersion through a restricted orifice into a zone of reduced pressure; and,
   (b) cooling the dispersion to provide solid particles of resin.

2. The process of claim 1 wherein the surface active agent is selected from the group consisting of sulfates, sulfonates, sarcosinates, taurates, isethionates, fatty amido phosphates, fatty amide derivatives, amido amines, higher alkyl amines, substituted imidazolines, substituted betaines, ethoxylated alkylol amides, ethoxylated phenols and ethoxylated fatty ethers.

3. The process of claim 1 wherein solid particles of resin produced in step (b) are recovered from the aqueous dispersion.

4. The process of claim 1 wherein the resin is a polyolefin.

5. The process of claim 4 wherein the resin is polyethylene or polypropylene homopolymer or copolymer.

6. The process of claim 1 wherein the resin is ethylene-ethyl acrylate copolymer.

7. The process of claim 1 wherein the resin is ethylene-vinyl acetate copolymer.

8. The process of claim 7 wherein the ethylene constitutes at least about 25% of the copolymer by weight.

9. The process of claim 1 wherein the strong base is an alkali metal hydroxide.

10. The process of claim 9 wherein the alkali metal hydroxide is sodium hydroxide.

11. The process of claim 1 wherein the dispersing system further contains a dispersion enhancing amount of a water-soluble substantially neutral salt.

12. The process of claim 11 wherein the neutral salt is sodium chloride.

13. The process of claim 2 wherein the sulfate surface active agent is a sodium salt of alkaryl polyether sulfate, sodium lauryl sulfate, or sodium lauryl ether sulfate.

14. The process of claim 2 wherein the sulfonate surface active agent is a sodium salt of alkaryl polyether sulfonate, sodium salt of alpha olefin sulfonate, or sodium xylene sulfonate.

15. The process of claim 2 wherein the sarcosinate surface active agent is sodium cocoyl sarcosine, sodium lauroyl sarcosine, or sodium myristoyl sarcosine.

16. The process of claim 2 wherein the taurate surface active agent is sodium N-cyclohexyl-N-palmitoyltaurate, sodium N-methyl-N-oleoyl taurate, sodium N-methyl-N-myristoyl taurate, sodium N-methyl-N-palmitoyl taurate, or sodium N-coconut acid-N-methyl taurate.

17. The process of claim 2 wherein the isethionate surface active agent is a coconut oil acid ester of sodium isethionate, or an oleic acid ester of sodium isethionate.

18. The process of claim 2 wherein the fatty amido phosphate surface active agent is a complex fatty amido phosphate.

19. The process of claim 2 wherein the fatty amide derivative is N,N-dimethyl lauramide, or N,N-ethylenebisstearamide.

20. The process of claim 2 wherein the higher alkyl amine surface active agent is an ethoxylated amine.

21. The process of claim 2 wherein the substituted imidazoline surface active agent is a substituted imidazoline derived from coconut fatty acids, lauric acid, isostearic acid, myristic acid, stearic acid, or oleic acid, or methyl (1) alkylamidoethyl (2) alkylimidazolinium sulfate.

22. The process of claim 2 wherein the substituted betaine surface active agent is coco betaine, coco amido betaine, fatty sulfobetaine, coco dimethyl ammonium carboxylic acid betaine, stearyl betaine, isostearyl amido betaine, lauryl amido betaine, myristoyl amido betaine, oleoyl amido betaine, oleoyl betaine, palmitoyl amido betaine, stearyl amido betaine or sulfo-coco amide betaine.

23. The process of claim 2 wherein the ethoxylated alkylol amide surface active agent is oleoyl diethanolamide.

24. The process of claim 2 wherein the ethoxylated phenol surface active agent is an octylphenoxy polyethoxy ethanol.

25. The process of claim 2 wherein the ethoxylated fatty ether is a polyoxyethylene (20) stearyl ether.

* * * * *